United States Patent [19]

Meisel, Jr.

[11] 4,241,956
[45] Dec. 30, 1980

[54] TRACK ASSEMBLY FOR CRAWLER-TYPE VEHICLES

[75] Inventor: Thomas C. Meisel, Jr., Peoria, Ill.

[73] Assignee: Caterpillar Tractor Co., Peoria, Ill.

[21] Appl. No.: 914,312

[22] Filed: Jun. 12, 1978

[51] Int. Cl.² ................. B62D 55/24; B62D 55/28
[52] U.S. Cl. .................. 305/35 EB; 305/38; 305/57
[58] Field of Search .............. 305/35 EB, 38, 57, 56

[56] References Cited

U.S. PATENT DOCUMENTS

| | | | |
|---|---|---|---|
| 2,303,945 | 12/1942 | Mayne et al. | 305/38 X |
| 3,007,745 | 11/1961 | Even | 305/56 |
| 3,054,644 | 9/1962 | Hausmann | 305/56 X |
| 3,680,926 | 8/1972 | Trapp | 305/35 EB |
| 3,773,394 | 11/1973 | Grawey | 305/38 |
| 3,899,220 | 8/1975 | Grawey et al. | 305/19 |

*Primary Examiner*—David A. Scherbel
*Attorney, Agent, or Firm*—Wegner, Stellman, McCord, Wiles & Wood

[57] ABSTRACT

A track assembly for crawler-type vehicles including a pair of spaced endless belts formed of flexible material and disposed in a generally parallel relation, a plurality of shoe-mounting cross bars extending through each of the belts to project from both sides thereof, the cross bars in one belt being aligned with the cross bars in the other belt, a plurality of elongated shoes spanning the belts and secured to corresponding aligned ones of the cross bars and disposed on the outer sides of the belts, a plurality of inwardly directed, sprocket engaging, nose-shaped lugs disposed in the space between the belts and extending inwardly of the inner sides thereof and secured to adjacent ends of aligned ones of the cross bars, and a plurality of inwardly directed, lateral guides on the inner sides of the belt extending inwardly of the inner sides thereof and secured to remote ends of aligned ones of the cross bars.

3 Claims, 4 Drawing Figures

TRACK ASSEMBLY FOR CRAWLER-TYPE VEHICLES

BACKGROUND OF THE INVENTION

This invention relates to track assemblies for crawler-type vehicles.

Over the years, there have been a variety of proposals for various constructions of track assemblies for use in crawler-type vehicles. Most commonly, track assemblies are of all metal construction utilizing track links interconnected by pins and mounting metallic track shoes. While such assemblies have worked well for their intended purpose, because of their all metal construction, they are extremely heavy. Moreover, the use of track pins interconnecting the links poses a sizable maintenance problem in that the vehicles employing such track assemblies typically operate in extremely hostile environments. As a consequence, considerable wear of the pins joining adjacent links occurs. Frequent maintenance and replacement is therefore required and such can be extremely time-consuming and laborious due to the weight of the components involved.

Because of the foregoing difficulties, there have been a variety of lesser known proposals for crawler-type track assemblies which do not utilize hingedly interconnected track links and which may be formed, in part, of nonmetal components. While certain of the proposals of the latter category have considerable merit, they are not without shortcomings. For example, many utilize flexible belts, typically formed of a reinforced elastomer, which must be spliced to form an endless belt and/or include apertures extending through the belt through which fasteners extend to mount track shoes. Such splices and/or fastener receiving apertures weaken the belt which, of course, reduces the useful life thereof. Moreover, in many cases, the constructions of the latter category are not easily susceptible to use in crawler-type vehicles of conventional design without substantial modification to the track frames, drive sprockets, idler sprockets, etc.

SUMMARY OF THE INVENTION

The present invention is directed to overcoming one or more of the above problems.

According to one aspect of the invention, there is provided a track assembly including a pair of spaced, endless belts formed of flexible material and disposed in a generally parallel relation. A plurality of shoe-mounting cross bars extend through each of the belts to project from both sides thereof, the cross bars in one belt being aligned with the cross bars in the other belt. A plurality of elongated shoes span the belts and are secured to corresponding aligned ones of the cross bars and disposed on the outer side of the belts. A plurality of inwardly directed, sprocket-engaging lugs are disposed in the space between the belts and extend inwardly of the inner sides thereof and are secured to adjacent ends of aligned ones of the cross bars. A plurality of inwardly directed lateral guides are located on the inner sides of the belt and extend inwardly of the inner side thereof and are secured to remote ends of aligned ones of the cross bars. This facet of the invention provides a strong assembly.

According to another facet of the invention, there is provided an elongated track frame and a pair of mounting assemblies are journalled at each end of the frame. Each mounting assembly comprises at least one cylinder and one includes an adjacent sprocket having radially outwardly directed teeth secured thereto. The cylinders and sprockets, if present, of the two assemblies are aligned and an endless belt formed of a flexible, elastomeric material is trained about the cylinders. The belt mounts, on one side, a plurality of inwardly directed lugs, at least some of which are in engagement with the sprocket and, on the other side, inwardly directed guides. The guides extend inwardly of the periphery of the cylinders adjacent the ends thereof remote from the sprocket. A plurality of shoes on the outer face of the belt are provided and the lugs, cylinders and sprocket are constructed such that loading transmitted to the belt from the shoes will be borne substantially entirely by the cylinders but not appreciably by the sprocket. This facet of the invention provides a track assembly which is easily adaptable to crawler-type vehicles of conventional design.

Other objects and advantages will become apparent from the following specification taken in connection with the accompanying drawings.

DESCRIPTION OF THE PREFERRED EMBODIMENT

Figure 1:
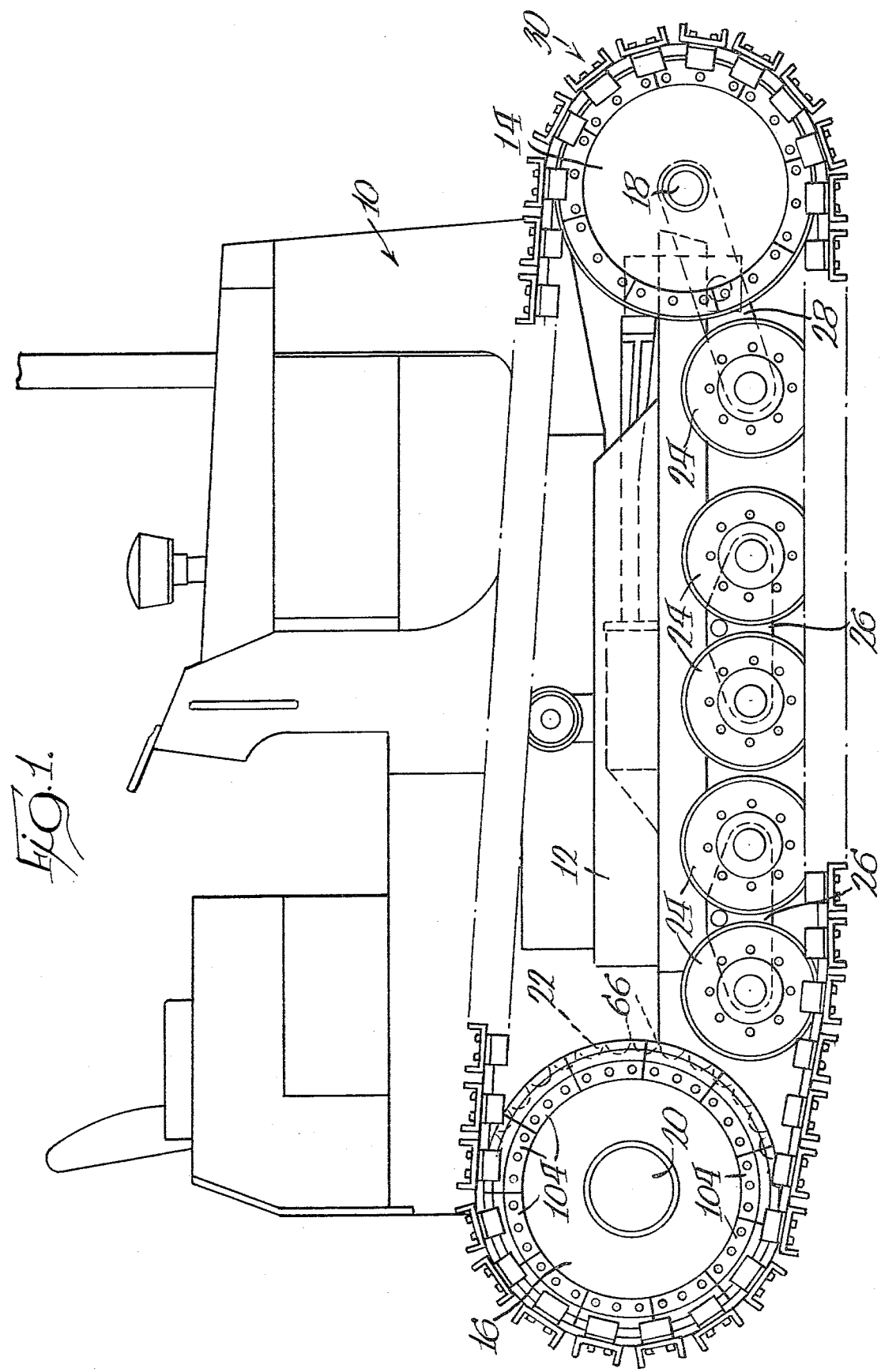
FIG. 1 is a side elevation of a crawler-type vehicle embodying a track assembly made according to the invention.

An exemplary embodiment of a track assembly made according to the invention is illustrated in FIG. 1 in connection with a crawler-type vehicle having a main frame 10 flanked by a pair of elongated track frames 12 (only one of which is shown in FIG. 1).

Opposite ends of the track frame 12 mount forward and rear track mounting assemblies 14 and 16, respectively, for rotation about axes 18 and 20. In the usual case, the rear mounting assembly 16 will be driven by the engine of the vehicle and to provide impetus to the track, the same includes a drive sprocket 22. The forward mounting assembly 14 is an idler assembly, as is well known, and may or may not include a sprocket similar to the sprocket 22, the presence or absence of the same being generally inconsequential to the present invention.

The underside of the track frame 12 mounts a plurality of track rollers 24, to be described in greater detail hereinafter, by means of bogey-type suspensions 26 of known construction. In this connection, the forwardmost track roller 24 and the idler 14 are mounted on a bogey-type suspension 28, also of known construction.

A track belt 30 made according to the invention is trained about the idler 14 and the drive 16 and will be described in greater detail with reference to FIGS. 2-4, inclusive.

Figure 4:
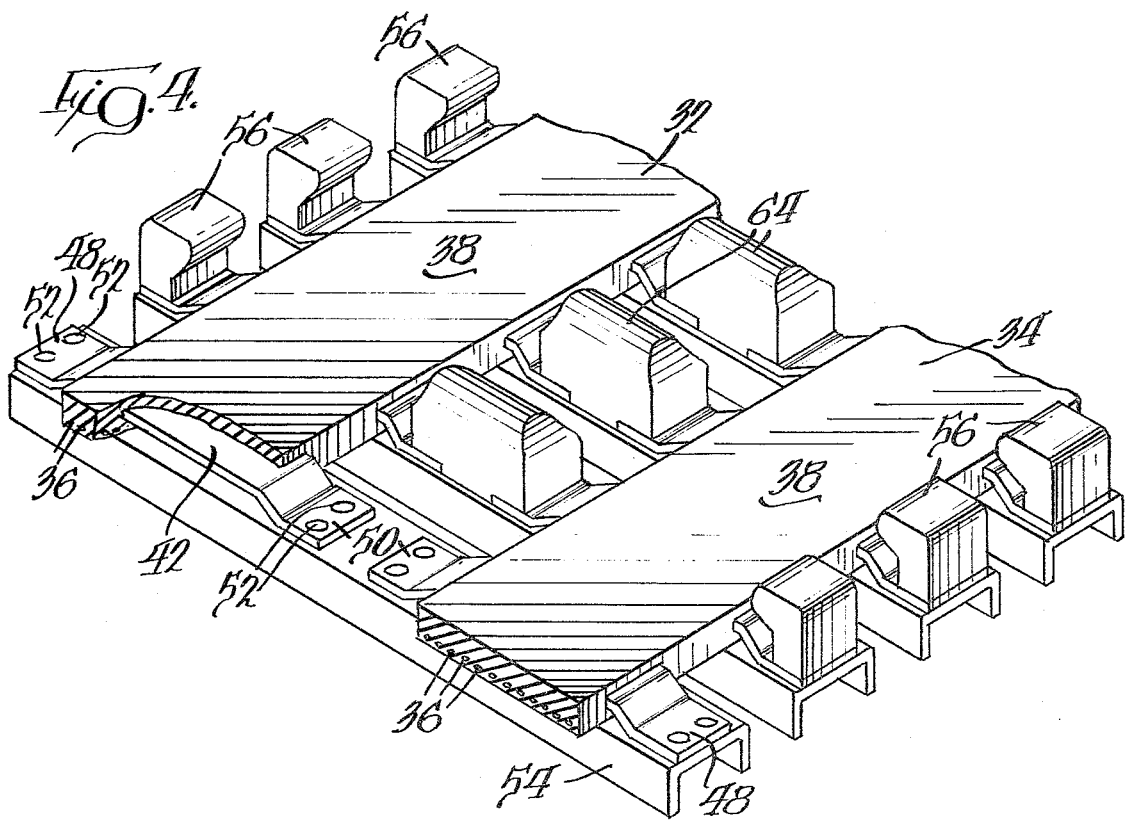
FIG. 4 is a fragmentary, perspective view of the track assembly dissociated from the vehicle with parts broken away for clarity.

With reference specifically to FIG. 4, the track is seen to include two, endless, spaced, generally parallel, flexible belts 32 and 34 formed of an elastomeric material and typically reinforced with wire 36 extending peripherally of the belts. The belts 32 and 34 may be fabricated in the manner taught in the commonly assigned U.S. Pat. No. 3,773,394 to Charles E. Grawey, issued Nov. 20, 1973, the details of which are incorporated by reference.

Figure 3:
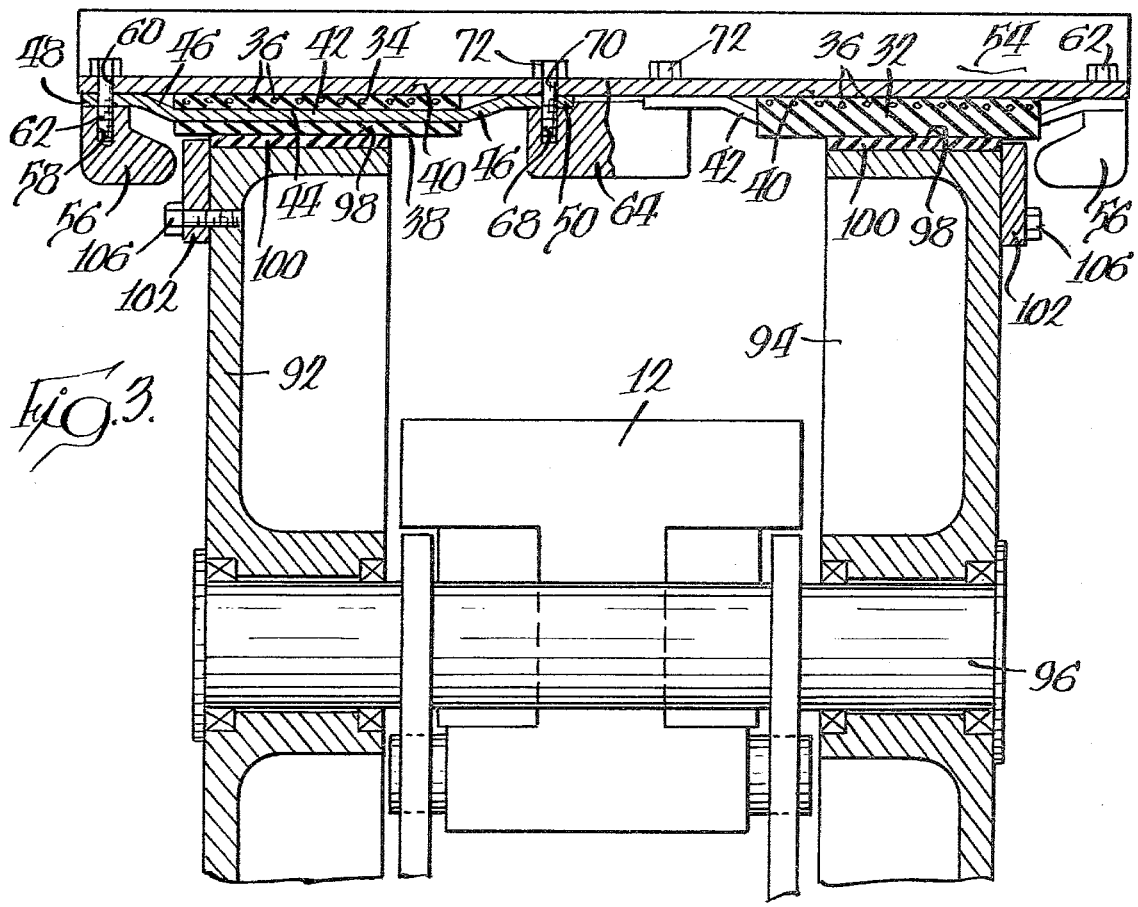
FIG. 3 is a further enlarged, sectional view of part of the track assembly.

Each belt 32 and 34 includes an inner face 38 and an opposed outer face 40 (FIG. 3). The track includes a plurality of cross bars 42 formed of any suitable metal or the like. As best seen in FIGS. 3 and 4, the cross bars 42 have a shallow U-shape including a bight 44, and opposed legs 46 which terminate in oppositely directed ends 48 and 50 which are disposed generally parallel to the bight 44. The cross bars 42 have their bights 44 extending through the belts 32 and 34 between the faces 38 and 40 thereof. They are also located at regular intervals about the periphery of the belts 32 and 34 and disposed on each belt 32 and 34 such that they align with similar cross bars in the other belt, as seen in FIG. 4. Preferably, the cross bars 42 are molded in place during the process of fabricating the belts 32 and 34.

As can be seen in FIG. 3, the oppositely directed ends 48 and 50 of each cross bar 42 are substantially coplanar with the outer face 40 of the associated belt 32 or 34 when the track belt is fully assembled and, as seen in FIG. 4, each of the ends 48 and 50 is provided with two bolt-receiving apertures 52.

The track includes a plurality of shoes in the form of elongated channels 54 which span the two belts 32 and 34 and extend at least to the remote ends 48 of aligned ones of the cross bars 42. Preferably, the channels 54 somewhat compress the belt 32 and 34 against the cross bars 42 for load sharing purposes.

Generally L-shaped, lateral guides 56 are provided and are in abutment with the remote ends 48 of each of the cross bars 42. As best seen in FIG. 3, the lateral guides 56 are inwardly directed and extend inwardly of the inner face 38 of the associated belt 32 and 34.

Each of the lateral guides 56 includes a pair of tapped bores 58, only one of which is shown. At the same time, the base of each of the shoes 54 is provided with, at its opposite ends, a pair of bores 60. The bores 58 and 60 are alignable with the apertures 52 in the cross bars 42 and bolts 62 are directed through the bores 60 in the apertures 54 to be threadably received in the tapped bores 58. As a consequence, the bolts 62 perform the dual function of securing both the shoes 54 and the lateral guides 56 to the cross bars 42.

The assembly further includes a plurality of of nose-shaped lugs 64, one for each of the shoes 54. The lugs 64 are inwardly directed and extend inwardly of the inner faces 38 of the belts 32 and 34. Their precise configuration will depend upon the configuration of the radially extending teeth 66 (FIG. 1) of the drive sprocket 22.

The lugs 64 are in abutment with the adjacent ends 50 of aligned ones of the cross bars 42 and, as seen in FIG. 3, include tapped bores 68 alignable with the apertures 52 in the ends 50. Bores 70 alignable with the apertures 52 are located in the base of each of the shoes 54 and bolts 72 extend through the bores 70, the apertures 52 and the ends 50 into threaded engagement with the tapped bores 68 and the lugs 64. Thus, the bolts 72 also perform a dual function in terms of further securing the shoes 54 to the cross bars 42 and securing the lugs 64 to the assemblage.

As a result of the foregoing construction, it will be appreciated that the track is not weakened by spliced belts nor by bolt receiving holes extending therethrough. All fasteners employed in securing the guides 56, the lugs 64, and the shoes 54 in the assembly pass through components other than the belts 32 and 34.

Figure 2:
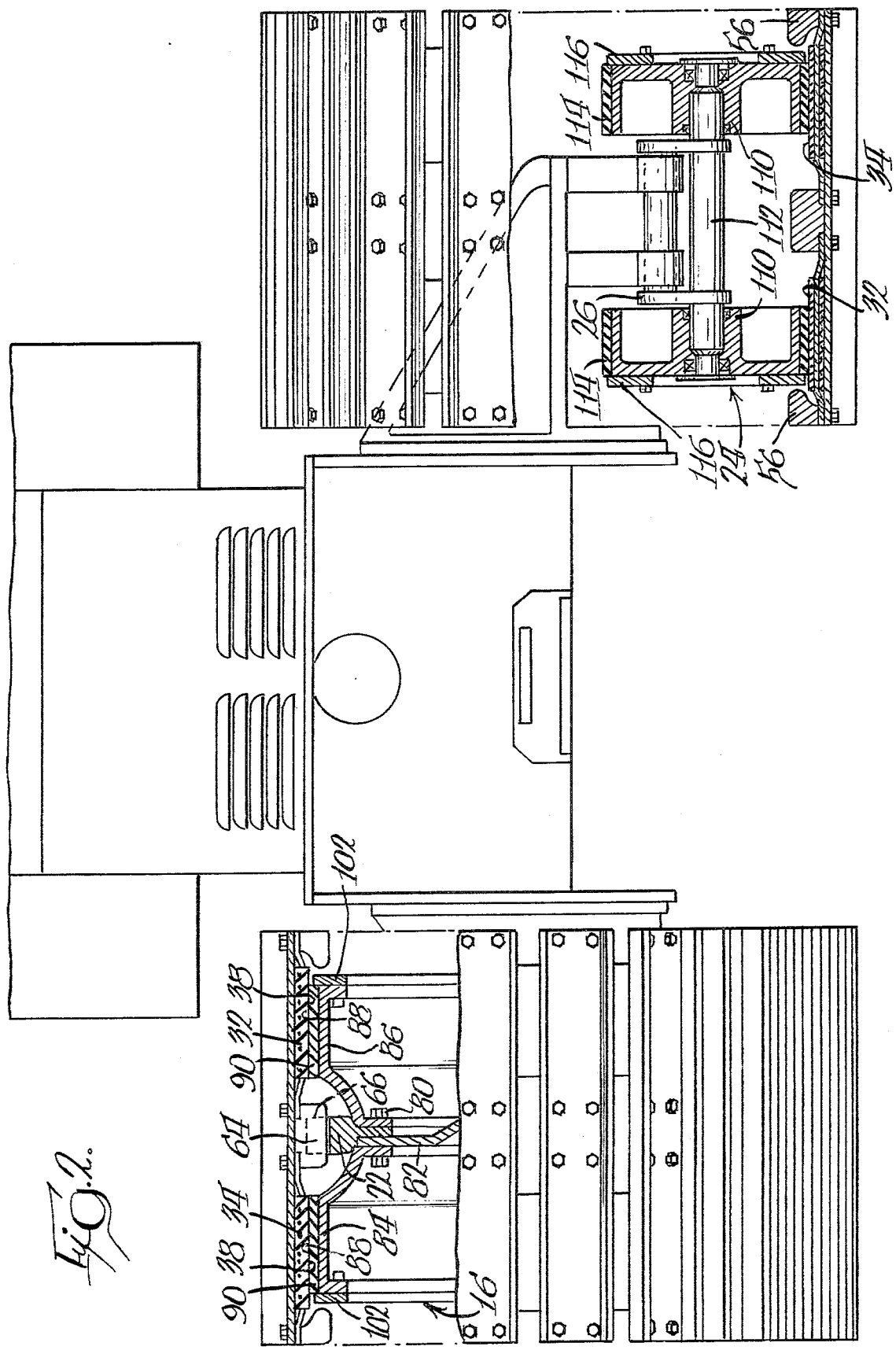
FIG. 2 is an enlarged, fragmentary, rear view of the vehicle with parts shown in section for clarity.

FIG. 2, at the left side thereof, illustrates the form of the mounting assembly 16 which is the driving assembly. The conventional drive sprocket is illustrated at 22 and is secured as by bolts 80 to a conventional web 82 driven by the final drive of the vehicle in known fashion.

According to the invention, the assembly 16 is supplemented by the provision of two cylinders 84 and 86 which are secured to the sprocket 22 by the bolts 80 to sandwich the same. It will be seen that the lugs 64 are in engagement with the teeth 66 of the sprocket 22 and that the inner faces 38 of the belts 32 and 34 are in engagement with the cylindrical surfaces 88 of the cylinders 86 and 84, respectively. The configuration preferably is such that any loading applied to the track is transmitted via the belts 32 and 34 to the cylinders 84 and 86 to be substantially entirely borne thereby with no substantial loading being transmitted to the sprocket 22 by the lugs 64. Consequently, the sprocket 22 is subject only to drive forces and not to loading forces.

In a preferred embodiment, the cylindrical surface 88 of each of the cylinders 84 and 86 is defined by an elastomeric sleeve 90.

FIG. 3 illustrates the configuration of the components defining the idler mounting assembly 14. Again, two cylinders, 92 and 94 are provided and the same are journalled on a shaft 96. Each cylinder 92 and 94 has a cylindrical surface 98 which is preferably defined by an elastomeric sleeve 100. The cylinders 92 and 94 are spaced so that the lugs 64 may pass between the two and the belts 32 and 34 are trained about the cylindrical surfaces 98 of the cylinders 94 and 92, respectively.

In this connection, it should be appreciated that, if desired, the cylinders 92 and 94 could take on the same form as the cylinders 84 and 86 utilized in the drive mounting assembly 16 and an idler sprocket retained between the two, particularly, if the invention is applied to the conversion of a track assembly of a conventional crawler-type vehicle to that of the present invention.

Each of the cylinders 84, 86, 92 and 94 is provided with a radially extending wear plate 102 on the laterally outer sides thereof in adjacency to the lateral guides 56. As best seen in FIG. 1, each of the wear plates 102 is defined by a plurality of segments 104 and the same are bolted in place by bolts 106.

As is well known, during turning movements of a crawler-type vehicle, considerable lateral forces are exerted on the track and in order to prevent lateral displacement of the track from the cylinders, the guides 56 are provided. During such turning movement, appreciable lateral shifting of the track is resisted by abutment of the guides 56 with corresponding ones of the wear plates 102.

The segmenting of each of the wear plates 102 is desirable in terms of ease of installation for the reason that if they were one piece, it would be difficult to align them properly with the ends of the associated cylinders in view of the inward extent of each of the lateral guides 56. In addition, since uneven wear of the wear plates may occasionally be encountered, only the worn segments 104 need be replaced rather than replacing the entire wear plate 102.

FIG. 2 also illustrates the construction of a typical track roller 24. Each roller 24 is defined by a pair of cylinders 110 journalled on a shaft 112 supported by the associated bogey suspension 26. The cylindrical surface of each cylinder 110 is defined by an elastomeric sleeve 114 and the sides of each cylinder 110 adjacent the lateral guides 56 is provided with a doughnut-shaped wear plate 116. The cylindrical surface of each cylinder 110 abuts and supports the inner face of the corresponding one of the belts 32 and 34. In some cases the aligned ones of the cross bars 42 may be unitary, that is, formed as a single cross bar extending through both of the belts 32 and 34.

From the foregoing, it will be appreciated that the invention provides a pinless track assembly eliminating the troublesome maintenance and replacement problems associated therewith. It will also be appreciated that the same is readily adaptable to conventional tractors and that it provides the means whereby the endless flexible belt need not be weakened by splices and/or fastener-receiving bores.

The embodiments of the invention in which an exclusive property or privilege is claimed are defined as follows:

1. A track assembly for crawler-type vehicles comprising:
    an elongated track frame;
    a pair of rotatable mounting assemblies, one journalled at each end of said frame, each mounting assembly comprising at least one cylinder and at least one mounting assembly further including an adjacent sprocket having radially outwardly directed teeth secured thereto, the cylinders of the two mounting assemblies being aligned;
    an endless belt formed of a flexible, elastomeric material trained about said cylinders and mounting on one side a plurality of inwardly directed lugs, at least some of which are in engagement with said sprocket and on the other side inwardly directed guides, said guides extending inwardly of the periphery of said cylinders adjacent the ends thereof remote from said sprocket;
    a plurality of shoes on the outer face of said belt;
    said lugs, cylinders and sprocket being constructed such that loading transmitted to said belt from said shoes will be borne substantially entirely by said cylinders and not appreciably by said sprocket; and
    a radially extending wear plate mounted on each of said remote ends of said cylinders for potential engagement with said guides.

2. A track assembly for use with crawler-type vehicles, comprising:
    a pair of flexible, endless belts of elastomeric material disposed in generally parallel and spaced relation and each having opposed sides and inner and outer faces;
    a plurality of cross bars each having a shallow U-shape including a bight with legs terminating in oppositely directed, generally coplanar, apertured ends disposed generally parallel to the bight, said cross bars being spaced about the periphery of each said belts with their bights received within the associated belt between the faces thereof and with said opposed ends aligned with the outer face of the belt, the cross bars in one belt being aligned with the cross bars in the other belt;
    a plurality of elongated shoes abutting the outer faces of said belts in alignment with aligned ones of said cross bars;
    a plurality of inwardly directed guides, two for each shoe, and located at opposite ends of each shoe in abutment with the remote ends of aligned ones of said cross bars, said guides extending inwardly beyond the inner faces of said belts;
    first securing means extending through the apertures at said remote ends and interconnecting said guides and said shoes;
    a plurality of inwardly directed lugs located in the space between said belts and extending inwardly of said inner faces, said lugs being in abutment with adjacent ends of aligned ones of said cross bars; and
    second securing means extending through the apertures at said adjacent ends and interconnecting said lugs and said shoes.

3. For use in a track assembly having a track frame journalling spaced, rotatable, track mounting assemblies at opposite ends thereof with at least one mounting assembly having a sprocket, the combination of:
    a plurality of cylinders, two for each mounting assembly, each having a diameter on the order of that of the corresponding sprocket, if present;
    means for securing the cylinders to the corresponding mounting assembly in concentric relation thereto and on opposite sides thereof to sandwich the corresponding sprocket, if present;
    a plurality of radially extending wear plates, one for each cylinder;
    means securing each wear plate to the corresponding cylinder to the remote ends thereof;
    a pair of spaced endless belts formed of elastomeric material disposed in generally parallel relation and each trained about two of said cylinders;
    a plurality of shoe-mounting cross bars extending through each of said belts to project from both sides thereof, the cross bars in one belt being aligned with the cross bars in the other belt;
    a plurality of elongated shoes spanning said belts and secured to corresponding aligned ones of said cross bars and disposed on the outer sides of said belts;
    a plurality of inwardly directed, sprocket-engaging, nose-shaped lugs disposed in the space between said belts extending inwardly of the inner sides thereof and secured to adjacent ends of aligned ones of said cross bars; and
    a plurality of inwardly directed, lateral guides extending inwardly of the inner sides of said belts and secured to remote ends of aligned ones of said cross bars.

* * * * *